(12) United States Patent
Nandy et al.

(10) Patent No.: US 6,646,988 B1
(45) Date of Patent: Nov. 11, 2003

(54) SYSTEM, DEVICE, AND METHOD FOR ALLOCATING EXCESS BANDWIDTH IN A DIFFERENTIATED SERVICES COMMUNICATION NETWORK

(75) Inventors: Biswajit B. Nandy, Kanata (CA); Nabil N. Seddigh, North Gower (CA); Peter S. Pieda, Ottawa (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/535,807

(22) Filed: Mar. 28, 2000

Related U.S. Application Data

(60) Provisional application No. 60/179,199, filed on Jan. 31, 2000.

(51) Int. Cl.⁷ .............................................. G01R 31/08
(52) U.S. Cl. ...................................... 370/235; 709/240
(58) Field of Search ............................ 370/229, 230.1, 370/231, 232, 235, 395.21, 395.52, 412; 709/232, 235, 240

(56) References Cited

U.S. PATENT DOCUMENTS

| | | | | |
|---|---|---|---|---|
| 5,164,938 A | * | 11/1992 | Jurkevich et al. | 370/231 |
| 5,268,900 A | * | 12/1993 | Hluchyj et al. | 370/429 |
| 5,426,640 A | * | 6/1995 | Hluchyj et al. | 370/235 |
| 6,023,453 A | * | 2/2000 | Ruutu et al. | 370/229 |
| 6,041,039 A | * | 3/2000 | Kilkki et al. | 370/230 |
| 6,081,504 A | * | 6/2000 | Tanaka et al. | 370/230 |
| 6,480,899 B1 | * | 11/2002 | Seddigh et al. | 709/240 |

OTHER PUBLICATIONS

Seddigh, Bandwidth assurance issues for TCP flows in a differentiated services network. Global Telecommunications Conference, 1999. GLOBECOM '99, vol.: 3, 1999 page(s): 1792–1798 vol. 3.*

* cited by examiner

Primary Examiner—Hassan Kizou
Assistant Examiner—Dmitry Levitan
(74) Attorney, Agent, or Firm—Steubing McGuinness & Manaras LLP (57) ABSTRACT

A bandwidth allocation system, device, and method for assigning a drop precedence value to each of a plurality of packets associated with a traffic stream having a target rate and a measured rate greater than the target rate assigns a drop precedence value to each of a plurality of packets associated with the traffic stream such that, of all packets assigned either a first drop precedence value or a second drop precedence value higher than the first drop precedence value, substantially (1−q) of the packets are assigned the first drop precedence value and substantially (q) of the packets are assigned the second drop precedence value, where q is equal to the ratio of a minimum target rate from among a plurality of traffic streams to the target rate of the traffic stream. Such a packet marking scheme may be used in a differentiate services communication system for proportionally distributing excess bandwidth between multiple traffic streams.

31 Claims, 8 Drawing Sheets

|  | Drop Precednece 0 | Drop Precedence 1 | Drop Precedence 2 |
|---|---|---|---|
| $Min_{th}$ | 40 pkts | 25 pkts | 10 pkts |
| $Max_{th}$ | 55 pkts | 40 pkts | 25 pkts |
| $Max_p$ | 0.02 | 0.05 | 0.1 |
| $W_q$ | 0.002 | 0.002 | 0.002 |

| Traffic Conditioner | First Simulation | Second Simulation | |
|---|---|---|---|
| | | 80% Provisioned | 40% Provisioned |
| Standard | 0.32 | 0.50 | 0.91 |
| TATC-3DP | 0.08 | 0.25 | 0.21 |

FIG. 9  900

SYSTEM, DEVICE, AND METHOD FOR ALLOCATING EXCESS BANDWIDTH IN A DIFFERENTIATED SERVICES COMMUNICATION NETWORK

PRIORITY

The present patent application claims priority from the commonly-owned U.S. Provisional Patent Application No. 60/179,199 entitled BANDWIDTH ALLOCATION SYSTEM, DEVICE, AND METHOD, which was filed on Jan. 31, 2000 in the names of Biswajit B. Nandy, Nabil N. Seddigh, and Peter S. Pieda, and is hereby incorporated herein by reference in its entirety.

FIELD OF THE INVENTION

The present invention relates generally to communication systems, and more particularly to allocating excess bandwidth in a differentiated services communication network.

BACKGROUND OF THE INVENTION

In today's information age, various networking devices, such as computers and computer peripherals, are frequently interconnected over a communication network. The networking devices include various networking applications that communicate over the communication network using a networking protocol. The communication network includes various networking nodes that route information between the networking devices based upon the networking protocol.

One common networking protocol is the Internet Protocol (IP). IP provides for connectionless communication between networking devices. Specifically, each networking device is associated with an IP address. Each protocol message sent from a source networking device to a destination networking device includes a source IP address associated with the source networking device and a destination IP address associated with the destination networking device. The networking nodes route each protocol message based upon at least the destination IP address.

In order to operate properly, some networking applications require the communication network to guarantee a certain quality of service (QoS) for the networking application. For example, the networking application may require a minimum amount of bandwidth, a maximum amount of end-to-end delay, a maximum amount of inter-message delay (jitter), or other services.

The basic IP architecture does not provide for such QoS guarantees. However, an architecture for Differentiated Services (Diffserv) has been defined within the Internet to Engineering Task Force (IETF) through a Request for Comments (RFC) to address QoS issues in IP networks. Diffserv is described in Blake, S. et al., "An Architecture for Differentiated Services", RFC 2475, December 1998, which is hereby incorporated herein by reference in its entirety.

The Diffserv architecture has recently become the preferred method to address QoS issues in IP networks. Diffserv utilizes a packet marking based approach to IP-QoS. This packet marking based approach to IP-QoS is attractive due to its simplicity and ability to scale. An end-to-end differentiated service is obtained by concatenation of per-domain services and Service Level Agreements (SLAs) between adjoining domains along the path that the traffic crosses in going from source to destination. Per domain services are realized by traffic conditioning at the edge and simple differentiated forwarding mechanisms at the core of the network. Two forwarding mechanisms recently standardized by the IETF are the Expedited Forwarding (EF) and Assured Forwarding (AF) Per Hop Behaviors (PHB). The EF PHB is described in Jacobson V, Nichols K, Poduri K, "An Expedited Forwarding PHB", RFC 2598, June 1999, which is hereby incorporated herein by reference in its entirety. The AF PHB is described in Heinanen J., Baker F., Weiss W., and Wroclawski J., "Assured Forwarding PHB Group", RFC 2597, June 1999, which is hereby incorporated herein by reference in its entirety.

The basis of the AF PHB is differentiated dropping of packets during congestion at the router. The differentiated dropping is achieved via Random Early Detection (RED)-like Active Queue Management (AQM) techniques. RED is described in Floyd, S., and Jacobson, V., "Random Early Detection gateways for Congestion Avoidance", IEEE/ACM Transactions on Networking, V. 1 N.4, August 1993, p. 397–413, which is hereby incorporated herein by reference in its entirety.

The AF PHB RFC specifies four classes and three levels of drop precedence per class. AF is an extension of the RIO scheme, which uses a single FIFO queue and two levels of drop precedence. RIO is described in Clark D. and Fang W., "Explicit Allocation of Best Effort Packet Delivery Service", IEEE/ACM Transactions on Networking, V.6 N. 4, August, 1998, which is hereby incorporated herein by reference in its entirety.

To build an end-to-end service with AF, subscribed traffic profiles for customers are maintained at the traffic conditioning nodes at the edge of the network. The aggregated traffic is monitored and packets are marked at the traffic conditioner. When the measured traffic exceeds the committed target rate, the packets are marked with higher drop precedence (DP1); otherwise packets are marked with lower drop precedence (DP0). If the measured traffic exceeds the peak target rate, the packets are marked with highest drop precedence (DP2). At the core of the network, at the time of congestion, the packets with DP1 marking have higher probability of being dropped than packets with DP0 marking. Similarly, packets with DP2 marking have higher probability of being dropped than packets with DP0 and DP1 marking. The different drop probabilities are achieved by maintaining three different sets of RED parameters—one for each of the drop precedence markings.

Recent studies of RIO-based schemes (see, for example, Ibanez J, Nichols K., "Preliminary Simulation Evaluation of an Assured Service", Internet Draft, draft-ibanez-diffserv-assured-eval-00.txt>, August 1998 or Seddigh, N., Nandy, B., Pieda, P, "Bandwidth Assurance Issues for TCP flows in a Differentiated Services Network", In Proceedings of Globecom'99, Rio De Janeiro, December 1999, both of which are hereby incorporated herein by reference in their entireties) showed that in an over-provisioned (under-subscribed) network, target rates for all customers are mostly achieved. However, excess bandwidth may be unfairly divided amongst the equal-paying customers. This unfairness is caused by at least 5 different factors: Round Trip Time (RTT), packet size, size of target rate, number of microflows sharing target aggregate, and presence of non-responsive flows.

The studies on size of target rate indicate that excess bandwidth is not distributed in proportion to the target rate but rather is distributed almost evenly amongst the subscribed target aggregates. Thus, if 2 customers subscribed to a service with one customer paying for 1 Mbps and the other for 4 Mbps in a 10 Mbps capacity network, the first customer would get a total of 3.5 Mbps and the second customer would get 6.5 Mbps. Thus, even though the second customer subscribed to four times the rate of the first customer (and presumably paid closer to four times the amount), he/she is not even getting twice as much bandwidth as the first customer. The decision of how to distribute the excess bandwidth is really a business choice that should be made by the service provider. However, it would be useful if the provider had the technical capability to provide either proportional or even-distribution of the excess bandwidth should they desire. The present invention provides a mechanism for proportional distribution of the excess bandwidth.

SUMMARY OF THE INVENTION

In accordance with one aspect of the invention, a traffic conditioning method assigns a drop precedence value to each of a plurality of packets associated with a traffic stream having a target rate and a measured rate greater than the target rate such that, of all packets assigned either a first drop precedence value or a second drop precedence value higher than the first drop precedence value, substantially $(1-q)$ of the packets are assigned the first drop precedence value and substantially $(q)$ of the packets are assigned the second drop precedence value, where q is equal to the ratio of a minimum target rate from among a plurality of traffic streams to the target rate of the traffic stream.

In accordance with another aspect of the invention, a traffic conditioning method assigns a drop precedence value to a packet associated with a traffic stream having a target rate and a measured rate greater than the target rate by assigning a first drop precedence value to the packet with a probability $(1-q)$ and assigning a second drop precedence value higher than the first drop precedence value to the packet with a probability $(q)$, where q is equal to the ratio of a minimum target rate from among a plurality of traffic streams to the target rate of the traffic stream.

In accordance with yet another aspect of the invention, a traffic conditioning method assigns a drop precedence value to a packet associated with a traffic stream having a target rate and a measured rate by assigning a first drop precedence value to the packet with a probability $(1-p)$, if the measured rate is greater than the target rate; assigning a second drop precedence value higher than the first drop precedence value to the packet with a probability $(1-q)$, if the measured rate is greater than the target rate and the packet is not assigned the first drop precedence value with the probability $(1-p)$; and assigning a third drop precedence value higher than the second drop precedence value to the packet, if the measured rate is greater than the target rate and the packet is assigned neither the first drop precedence value with the probability $(1-p)$ nor the second drop precedence value with the probability $(1-q)$ (i.e., the third drop precedence value is assigned with probability q), wherein p is equal to the ratio of the measured rate minus the target rate to the measured rate, and wherein q is equal to the ratio of a minimum target rate from among a plurality of traffic streams to the target rate of the traffic stream. The traffic conditioning method assigns the first drop precedence value to the packet, if the measured rate is less than or equal to the target rate.

In accordance with still another aspect of the invention, a device includes a target aware traffic conditioner for assigning a drop precedence value to a packet that is associated with a traffic stream having a target rate and a measured rate. The target aware traffic conditioner includes a packet marker for assigning a first drop precedence value to the packet with a probability $(1-p)$, if the measured rate is greater than the target rate; assign a second drop precedence value higher than the first drop precedence value to the packet with probability a $(1-q)$, if the measured rate is greater than the target rate and the packet is not assigned the first drop precedence value with the probability $(1-p)$; and assign a third drop precedence value higher than the second drop precedence value to the packet, if the measured rate is greater than the target rate and the packet is assigned neither the first drop precedence value with probability the $(1-p)$ nor the second drop precedence value with the probability $(1-q)$ (i.e., the third drop precedence value is assigned with probability q), wherein p is equal to the ratio of the measured rate minus the target rate to the measured rate, and wherein q is equal to the ratio of a minimum target rate from among a plurality of traffic streams to the target rate of the traffic stream. The packet marker assigns the first drop precedence value to the packet, if the measured rate is less than or equal to the target rate. The target aware traffic conditioner also includes rate measurement logic for determining the measured rate for the traffic stream based upon packets received for the traffic stream and for providing the measured rate to the packet marker. The target aware traffic conditioner also includes a target rate storage for storing at least a minimum target rate for a plurality of traffic streams and the target rate for the traffic stream. The target aware traffic conditioner also includes a pseudo-random number generator operably coupled to provide random values to the packet marker. The packet marker assigns the first drop precedence value to the packet with the probability $(1-p)$ by selecting a first random number from zero to one using the pseudo-random number generator and assigning the first drop precedence value to the packet if the first random number is less than the value $(1-p)$. The packet marker assigns the second drop precedence value to the packet with probability a $(1-q)$ by selecting a second random number from zero to one using the pseudo-random number generator and assigning the second drop precedence value to the packet if the second random number is less than the value $(1-q)$. The packet marker assigns the third drop precedence value to the packet if the second random number is greater than or equal to the value $(1-q)$.

In accordance with still another aspect of the invention, a program product includes a target aware traffic conditioner for assigning a drop precedence value to a packet that is associated with a traffic stream having a target rate and a measured rate. The target aware traffic conditioner includes a packet marker for assigning a first drop precedence value to the packet with a probability $(1-p)$, if the measured rate is greater than the target rate; assign a second drop precedence value higher than the first drop precedence value to the packet with probability a $(1-q)$, if the measured rate is greater than the target rate and the packet is not assigned the first drop precedence value with the probability $(1-p)$; and assign a third drop precedence value higher than the second drop precedence value to the packet, if the measured rate is greater than the target rate and the packet is assigned neither the first drop precedence value with probability the $(1-p)$ nor the second drop precedence value with the probability $(1-q)$ (i.e., the third drop precedence value is assigned with probability q), wherein p is equal to the ratio of the measured rate minus the target rate to the measured rate, and wherein q is equal to the ratio of a minimum target rate from among a plurality of traffic streams to the target rate of the traffic stream. The packet marker assigns the first drop precedence value to the packet, if the measured rate is less than or equal to the target rate. The target aware traffic conditioner also includes rate measurement logic for determining the measured rate for the traffic stream based upon packets received for the traffic stream and for providing the measured rate to the packet marker. The packet marker obtains the minimum target rate for a plurality of traffic streams and the target rate for the traffic stream from a target rate storage. The packet marker assigns the first drop precedence value to the packet with the probability (1−p) by selecting a first random number from zero to one and assigning the first drop precedence value to the packet if the first random number is less than the value (1−p). The packet marker assigns the second drop precedence value to the packet with probability a (1−q) by selecting a second random number from zero to one and assigning the second drop precedence value to the packet if the second random number is less than the value (1−q). The packet marker assigns the third drop precedence value to the packet if the second random number is greater than or equal to the value (1−q).

In accordance with still another aspect of the invention, a communication system includes a plurality of traffic streams supported by at least one edge node and a core node. A traffic conditioning edge node supporting a traffic stream having a target rate and a measured rate greater than the target rate assigns a drop precedence value to each of a plurality of packets associated with the traffic stream such that, of all packets assigned either the first drop precedence value or the second drop precedence value, substantially (1−q) of the packets are assigned the first drop precedence value and substantially (q) of the packets are assigned the second drop precedence value, wherein q is equal to the ratio of a minimum target rate from among a plurality of traffic streams to the target rate of the traffic stream. The core node selectively drops packets based upon at least the drop precedence value assigned to each of the plurality of packets.

In various embodiments of the invention, the target aware traffic conditioner is used for supporting differentiated services using three drop precedence values per assured forwarding class for indicating a lowest drop precedence level, an intermediate drop precedence level, and a highest drop precedence level. When the measured rate for a traffic stream is less than or equal to the target rate for the traffic stream, the target aware traffic conditioner typically assigns all packets the lowest drop precedence level. When the measured rate for the traffic stream is greater than the target rate for the traffic stream, the target aware traffic conditioner may assign the lowest drop precedence level to a certain percentage of packet, but distributes the remaining packets between the intermediate drop precedence level and the highest drop precedence level such that a packet is assigned the intermediate drop precedence level with probability (1−q) and is assigned the highest drop precedence level with probability (q), wherein q is equal to the ratio of a minimum target rate from among a plurality of traffic streams to the target rate of the traffic stream.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

In Clark D. and Fang W., "Explicit Allocation of Best Effort Packet Delivery Service", IEEE/ACM Transactions on Networking, V.6 N. 4, August, 1998, which is hereby incorporated herein by reference in its entirety, Clark and Fang reported the initial simulation study on a differentiated drop scheme. The paper introduced RIO (RED with In/Out) and a remarking policer that utilized an average time sliding window (TSW) rate estimator and intelligent marker. The main contribution of that work was to show that source target rates could be assured in a simple capacity allocated network that relies on statistical multiplexing.

In Ibanez J, Nichols K., "Preliminary Simulation Evaluation of an Assured Service", Internet Draft, draft-ibanez-diffserv-assured-eval-00.txt>, August 1998, which was incorporated by reference above, Ibanez and Nichols (via simulation studies) showed that RTT, target rate, TCP/UDP interactions are key factors in the throughput of flows that obtain an Assured Service using a RIO-like scheme. Their main conclusion is that such an Assured Service "cannot offer a quantifiable service to TCP traffic".

In Nandy, B., Seddigh, N., Pieda, P., "Diffserv's Assured Forwarding PHB: What Assurance does the Customer Have?," NOSSDAV'99, which is hereby incorporated herein by reference in its entirety, Nandy, Seddigh, and Pieda discuss seven different factors that can bias bandwidth assurance for equal paying customers.

In Seddigh, N., Nandy, B., Pieda, P., "Bandwidth Assurance Issues for TCP flows in a Differentiated Services Network", In Proceedings of Globecom'99, Rio De Janeiro, December 1999, which was incorporated by reference above, Seddigh, Nandy and Pieda confirmed with detailed experimental study that the above mentioned factors are critical for biasing distribution of excess bandwidth in an over-provisioned network, and also showed that the number of micro-flows in an aggregate and packet sizes play a key role in determining the bandwidth achieved in over-provisioned networks.

Recently, various researchers have reported new approaches to mitigate the biasing effects of some of the factors outlined in the aforementioned articles. In Lin W, Zheng R and Hou J, "How to Make Assured Services More Assured", In Proceedings of ICNP, Toronto, Canada, October 1999, which is hereby incorporated by reference in its entirety, Lin, Zheng and Hou propose an enhanced TSW profiler and two enhanced RIO queue management algorithms. The simulation results show that the combination of enhanced algorithms improves the throughput and fairness requirements especially with different target rates, RTTs and co-existing UDP flows. However, the proposed solutions may not be scalable due to the usage of state information at the core of the network.

Various approaches are possible to achieve proportional distribution of excess bandwidth. One approach is to modify the TCP windowing mechanism at the end host and make it target-rate aware. A second approach is to use the knowledge of target rates to affect dropping at the congested core devices. A third approach is to introduce a mechanism at the edge of the network to perform intelligent traffic conditioning based on knowledge of target rates.

In an embodiment of the present invention, a Target-Aware Traffic Conditioner (TATC) utilizes this third approach to achieve proportional distribution of excess bandwidth in an over-provisioned (under-utilized) Differentiated Services network. Thus, the TATC is implemented in various edge devices within the communication network. The third approach is utilized in part because it does not involve modification of the end-host TCP stack (an exercise that is difficult to achieve given the tight control and large deployed customer base) as would be required for the first approach, and is more scalable than the second approach.

Each packet processed by the TATC is associated with a stream that is determined according to the source and destination IP addresses in the packet. Each stream is associated with a target rate that is equivalent to the Committed Information Rate (CIR). The TATC requires target rate information in order to perform intelligent traffic conditioning. In an exemplary embodiment of the invention, an existing policy management framework periodically determines the minimum target rate for each stream and communicates the target rate information to the edge devices, for example, using a protocol such as the Common Open Policy Service (COPS) protocol that is described in an Internet Engineering Task Force (IETF) Request For Comments (RFC) by J. Boyle, R. Cohen, D. Durham, S. Herzog, R. Rajan, and A. Sastry entitled "The COPS (Common Open Policy Service) Protocol," RFC 2748, January 2000, which is hereby incorporated herein by reference in its entirety. Such a mechanism for determining and distributing the target rate information works well when the target rates are substantially static (which is typical), although a different mechanism is required when the target rates are more dynamic.

The TATC determines a drop precedence for each packet based on, among other things, the target rate for the corresponding packet. In an exemplary embodiment of the invention, there are three drop precedence levels, namely drop precedence zero (DP0), drop precedence one (DP1), and drop precedence two (DP2). Packets with DP0 are less likely to be dropped than packets with DP1, and packets with DP1 are less likely to be dropped than packets with DP2.

In an exemplary embodiment of the invention, when a traffic stream conforms to its target rate, the stream is considered to be "in-profile," and the TATC marks packets with DP0. When the traffic stream exceeds its target rate, the stream is considered to be "out-of-profile," in which case the TATC distributes packets between DP0, DP1, and DP2 depending on certain criteria.

The TATC marks out-of-profile packets based on the following premise: if two traffic streams exist, the stream with higher target rate will have a larger proportion of its packets marked in DP1 than the aggregate with lower target rate. The corollary to this is that the aggregate with higher target bandwidth will have a smaller proportion of its packets marked with DP2 than the aggregate with lower target bandwidth. Thus, during times of congestion, the aggregate with the lower target bandwidth will have a larger proportion of its packets dropped than the aggregate with the higher target bandwidth, since DP2 packets are dropped with higher probability than DP1 packets by core devices.

With respect to a particular packet that is associated with a particular stream, the TATC first determines the measured rate for the stream over some time window. If the measured rate is less than or equal to the target rate ("in-profile"), then the TATC marks the packet with DP0. If the measured rate is greater than the target rate ("out-of-profile"), then the TATC marks the packet as either DP0, DP1, or DP2 as follows. The TATC marks the packet DP0 with probability (1−p), where p is equal to the difference between the measured rate (MeasuredRate) and the target rate (TargetRate), divided by the measured rate, as follows:

$$p=(\text{MeasuredRate}-\text{TargetRate})/\text{MeasuredRate} \qquad \text{Eq. 1}$$

If the packet is not marked DP0 at this point, then the TATC marks the packet DP1 with probability (1−q) and marks the packet DP2 with probability (q), where q is equal to the minimum target rate from among all streams (minTargetRate) divided by the target rate of the stream (AggregateTargetRate), as follows:

$$q=\text{minTargetRate}/\text{AggregateTargetRate} \qquad \text{Eq. 2}$$

For example, assume that there are three streams A, B, and C having target rates 1, 2, and 3, respectively. The minimum target rate (minTargetRate) is equal to 1. The aggregate target rate (AggregateTargetRate) for stream A is equal to 1, the aggregate target rate (AggregateTargetRate) for stream B is equal to 2, and the aggregate target rate (AggregateTargetRate) for stream C is equal to 3. Thus, the value q for stream A is equal to ¹⁄₁, the value q for stream B is equal to ½, and the value q for stream C is equal to ⅓. Thus, when choosing between DP1 and DP2, a packet for stream A has a probability of 0 for DP1 and a probability 1 for DP2, a packet for stream B has a probability of ½ for DP1 and a probability of ½ for DP2, and a packet for stream C has a probability of ⅔ for DP1 and a probability of ⅓ for DP2.

Figure 1:
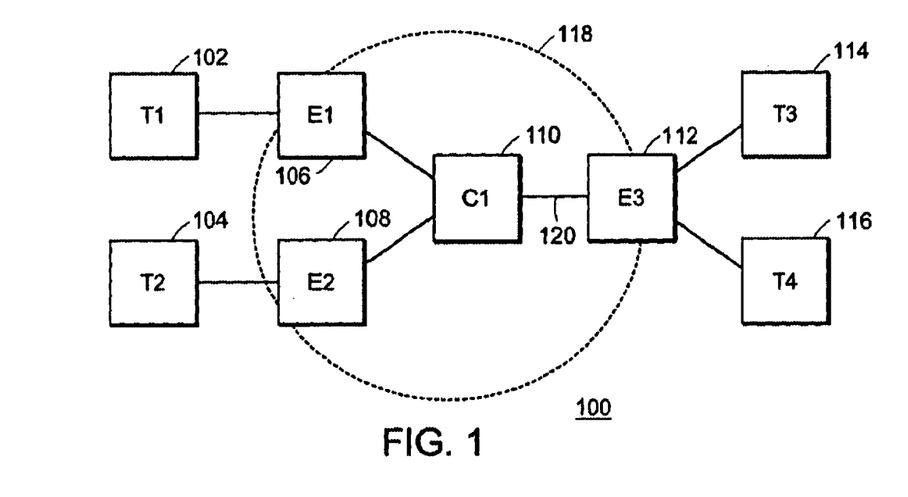
FIG. 1 is a network diagram showing an exemplary communication network in which target aware traffic conditioning is used to proportionally distribute excess bandwidth in accordance with an embodiment of the present invention.

FIG. 1 is a network diagram showing an exemplary communication network 100 in which target aware traffic conditioning is used to proportionally distribute excess bandwidth. The communication network 100 includes four traffic sources, namely traffic source T1 (102), traffic source T2 (104), traffic source T3 (114), and traffic source T4 (116). The traffic sources are interconnected over a network domain (118) that includes a core node C1 (110) and three edge nodes, namely edge node E1 (106), edge node E2 (108), and edge node E3 (112). Each traffic source interfaces to the network domain (118) through an edge node. Specifically, traffic source T1 (102) interfaces to the network domain (118) through edge node E1 (106), traffic source T2 (104) interfaces to the network domain (118) through edge node E2 (108), traffic source T3 (114) interfaces to the network domain (118) through edge node E3 (112), and traffic source T4 (116) interfaces to the network domain (118) through edge node E3 (112).

Within the network domain (118), the edge nodes (106, 108, 112) perform a target aware traffic conditioning function that, among other things, assigns a drop precedence to each packet. In order for the edge nodes (106, 108, 112) to assign a drop precedence to each packet using the target aware traffic conditioning technique described herein, the edge nodes (106, 108, 112) must share target rate information. This may be done, for example, by a policy management infrastructure that distributes target rate information for all streams that are accepted by the policy management infrastructure, for example, using a COPS-like protocol, or through manual configuration of target rate information.

Figure 2:
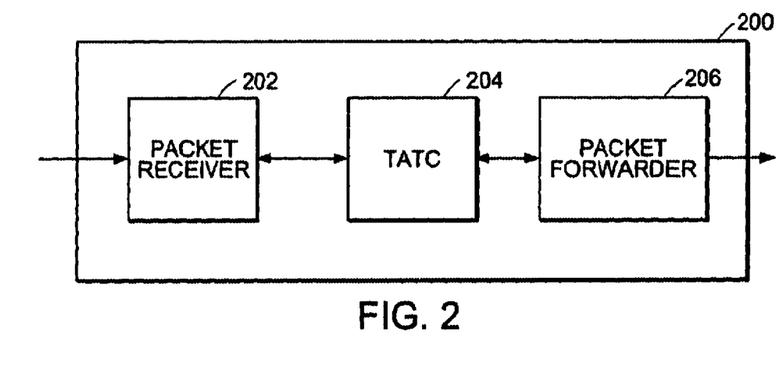
FIG. 2 is a block diagram showing the relevant components of an exemplary networking device including a target aware traffic conditioner in accordance with an embodiment of the present invention.

FIG. 2 is a block diagram showing the relevant components of an exemplary edge node 200, such as the edge node E1 (106), the edge node E2 (108), or the edge node E3 (112). Each edge node 200 includes, among other things, a packet receiver (202), a TATC (204), and a packet forwarder (206). The packet receiver (202) is operably coupled to receive packets from one or more traffic sources and to forward the packets to the TATC (204). The TATC (204) is operably coupled to assign a drop precedence to each packet using the target aware traffic conditioning scheme described herein and to forward the packets to the packet forwarder (206). The packet forwarder (206) is operably coupled to forward the packets over the network domain (118).

Figure 3:
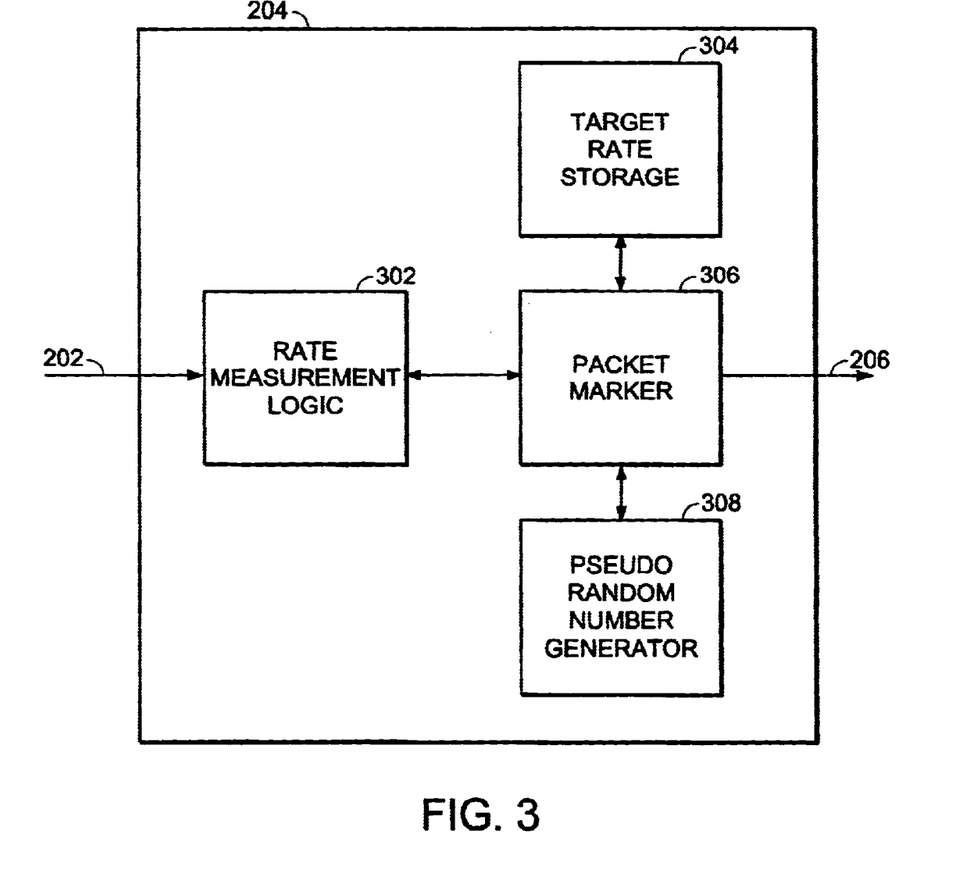
FIG. 3 is a block diagram showing the relevant components of an exemplary target aware traffic conditioner in accordance with an embodiment of the present invention.

FIG. 3 is a block diagram showing the relevant components of an exemplary TATC (204). The TATC (204) includes rate measurement logic (302), target rate storage (304), packet marker (306), and pseudo-random number generator (308). Target rate information for the various edge nodes is stored in the target rate storage (304). The rate measurement logic (302) determines the measured rate for each stream based upon packets received from the packet receiver (202), and provides measured rate information to the packet marker (306). The packet marker (306) assigns a drop precedence to each packet based upon, among other things, measured rate information obtained from the rate measurement logic (302) as well as target rate and minimum target rate information obtained from the target rate storage (304). The packet marker (306) uses the pseudo-random number generator (308) for determining probability values for assigning drop precedence values, as described in greater detail below.

With respect to a particular packet that is associated with a particular stream, the packet marker (306) first determines whether the stream is in-profile or out-of-profile based on the measured rate obtained from the rate measurement logic (302) and the target rate for the stream obtained from the target rate storage (304). If the measured rate is less than or equal to the target rate ("in-profile"), then the packet marker (306) marks the packet with DP0. If the measured rate is greater than the target rate ("out-of-profile"), then the packet marker (306) marks the packet as either DP0, DP1, or DP2 based on the measured rate obtained from the rate measurement logic (302) and the target rate and minimum target rate obtained from the target rate storage (304) as follows. The packet marker (306) marks the packet DP0 with probability (1−p), where p is equal to the difference between the measured rate (MeasuredRate) and the target rate (TargetRate), divided by the measured rate, according to Eq. 1. If the packet is not marked DP0 at this point, then the packet marker (306) marks the packet DP1 with probability (1−q) and marks the packet DP2 with probability (q), where q is equal to the minimum target rate from among all streams (minTargetRate) divided by the target rate of the stream (AggregateTargetRate), according to Eq. 2.

Figure 4:
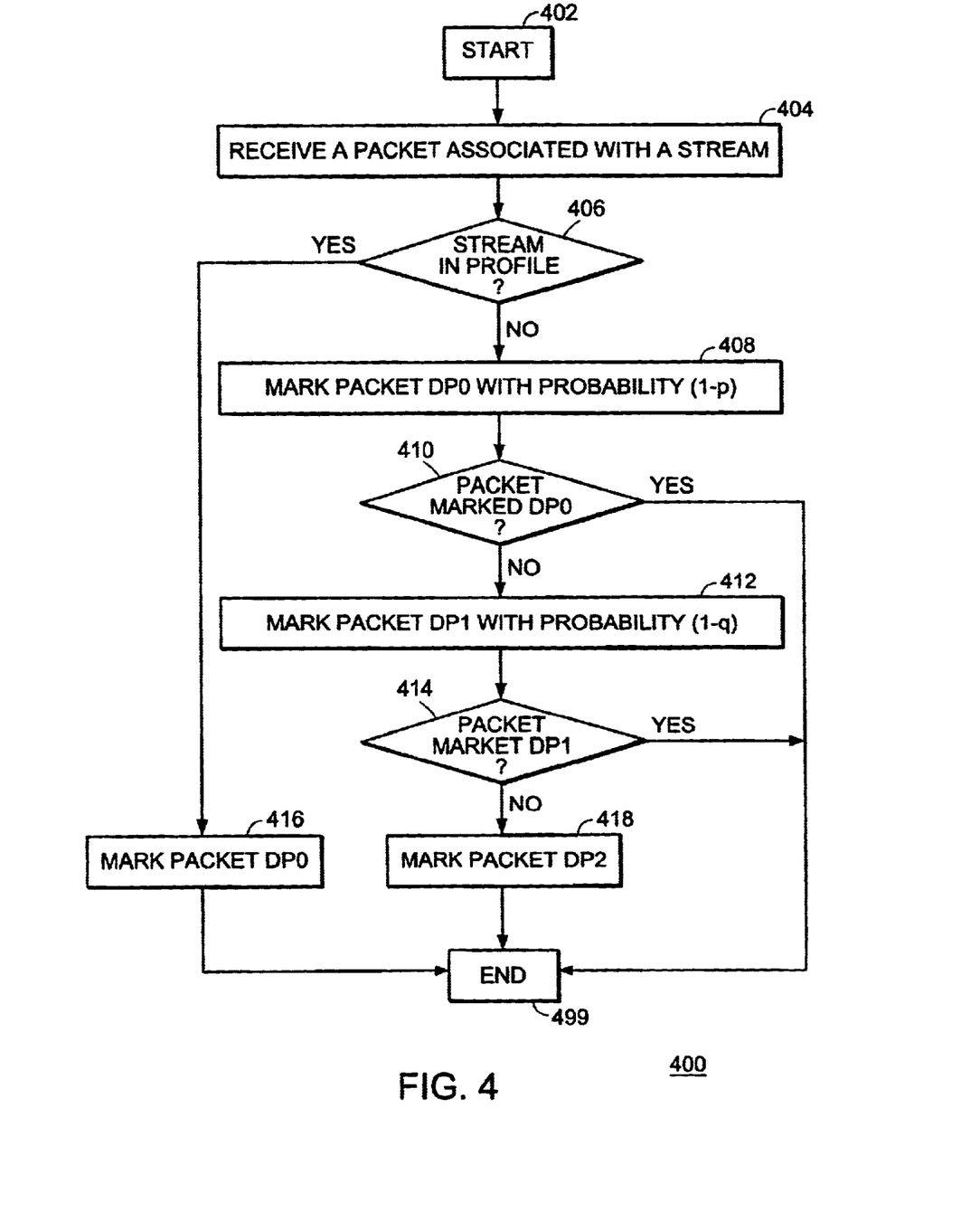
FIG. 4 is a logic flow diagram showing exemplary logic for assigning a drop precedence to a packet by a target aware traffic conditioner in accordance with an embodiment of the present invention.

FIG. 4 is a logic flow diagram showing exemplary logic 400 for assigning a drop precedence to a packet by the target aware traffic conditioner 204, and more particularly by the packet marker (306). Beginning at step 402, and upon receiving a packet associated with a stream, in step 404, the logic determines whether the stream is in-profile or out-of-profile, in step 406, specifically based on the measured rate obtained from the rate measurement logic (302) and the target rate obtained from the target rate storage (304). If the stream is in-profile (YES in step 406), then the logic marks the packet DP0, in step 416, and terminates in step 499. If the stream is out-of-profile (NO in step 406), then the logic marks the packet DP0 with probability (1−p), in step 408. If the packet is marked DP0 at this point (YES in step 410), then the logic terminates in step 499. If the packet is not marked DP0 at this point (NO in step 410), then the logic marks the packet DP1 with probability (1−q), in step 412. If the packet is marked DP1 at this point (YES in step 414), then the logic terminates in step 499. If the packet is not marked DP1 at this point (NO in step 414), then the logic marks the packet DP2, in step 418, and terminates in step 499.

When the packet marker (306) needs to make a probability decision for assigning a drop precedence value to a packet (for example, in steps 408 and 412 of the logic 400 described with reference to FIG. 4 above), the packet marker (306) uses the pseudo-random number generator (308) to select a random number from zero to one. The packet marker (306) then compares the random number to the particular probability value. If the random number is less than the probability value, then the probability criteria is considered to be satisfied. If the random number is greater than or equal to the probability value, then the probability criteria is considered to be unsatisfied. Thus, the packet is marked DP0 in step 408 if the random number is less than (1−p), and the packet is marked DP1 in step 412 if the random number is less than (1−q). It should be noted that the packet marker (306) preferably selects a new random number for each probability decision.

After the packet marker (306) assigns a drop precedence to the packet, the packet marker (306) forwards the packet to the packet forwarder (206), which in turn forwards the packet over the network domain (118).

Within the network domain (118), the core node C1 (110) performs a packet forwarding and selective packet dropping function based on, among other things, the drop precedence of each packet and a predetermined drop scheme for each drop precedence level. The predetermined drop scheme for each drop precedence level is based on the amount of congestion. In an exemplary embodiment of the invention, the core node C1 (110) maintains three separate (physical or virtual) queues, one for each drop precedence level, and queues packets according to drop precedence level. The core node C1 (110) is also programmed with three sets of RED thresholds, one for each drop precedence level. The RED thresholds are typically configured such that no lower drop precedence packets are dropped until all higher drop precedence packets are being dropped. The core node C1 (110)

tracks three separate average buffer occupancy or queue length calculations, one for DP0 packets (q0), one for DP1 packets (q1), and one for DP2 packets (q2). The probability of dropping DP0 packets depends only on the buffer occupancy q0. The probability of dropping DP1 packets depends on the total buffer occupancy of q0 plus the buffer occupancy of q1. The probability of dropping DP2 packets depends on the total buffer occupancy of q0 plus the buffer occupancy of q1 plus the buffer occupancy of q2. This scheme gives the appearance of three coupled virtual queues within a physical queue.

Simulations using a standard traffic conditioner and a target aware traffic conditioner demonstrate the ability of the target aware traffic conditioner to more proportionally distribute excess bandwidth compared to the standard traffic conditioner under certain conditions. The standard traffic conditioner is a remarking policer that utilizes the TSW tagger scheme of Clark and Fang proposed to work in conjunction with RIO. Simulations are performed using a ns-2 network simulator (Network simulator (ns-2), University of California at Berkeley, Calif., 1997. Available via http://ww-nrg.ee.lbl.gov/ns/) enhanced to include network elements with Diffserv edge and core device functionality as described in RFC 2475.

Figure 5:
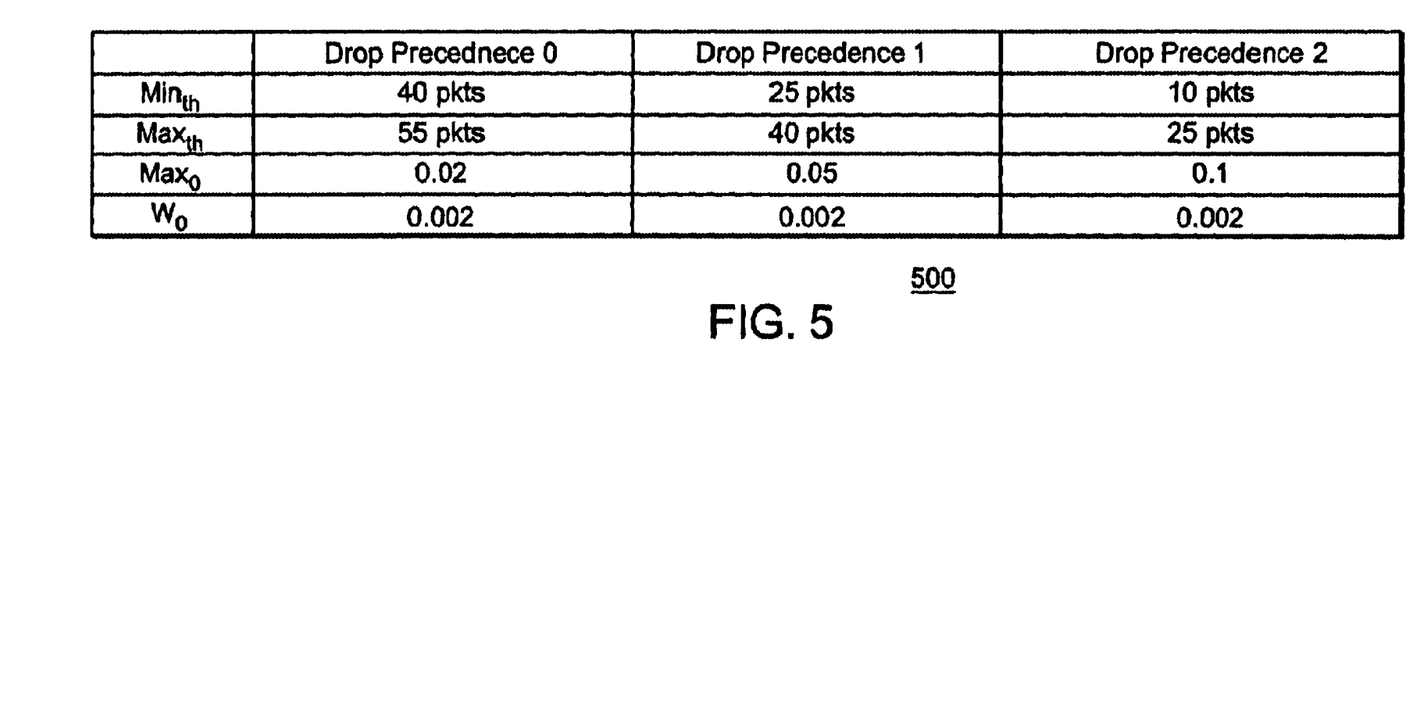
FIG. 5 is a table showing exemplary RED parameter settings for simulating the target aware traffic conditioner in accordance with an embodiment of the present invention.

The table 500 in FIG. 5 shows exemplary RED parameter settings that are used by the core node for the simulations. The Minth and Maxth thresholds are selected so that no lower drop precedence packets are dropped until all higher drop precedence packets are being dropped.

A first simulation utilizes the network topology shown in FIG. 1. The link (120) is a 10 Mbps link that is the "bottleneck" link for the simulation. One traffic stream from traffic source T1 (102) to traffic source T3 (114) is an aggregate of six TCP flows, and has a target rate of 1Mbps. Another traffic stream from traffic source T2 (104) to traffic source T4 (116) is an aggregate of six TCP flows, and has a target rate that is varied between 0.5 Mbps and 11.5 Mbps. Thus, the capacity allocation ranges from roughly 15% to 120% at the bottleneck link (120).

Figure 6:
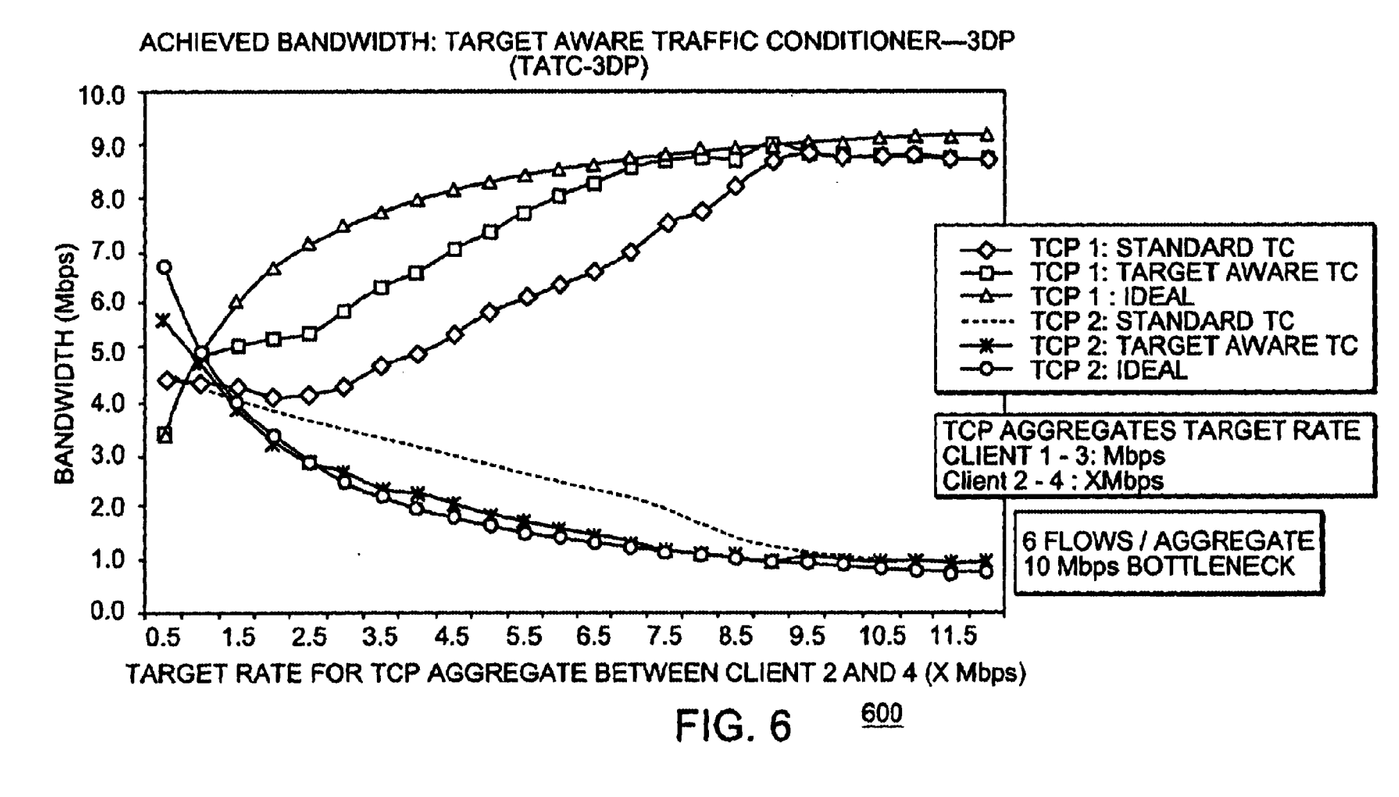
FIG. 6 is a graph showing results of a first simulation for both a standard traffic conditioner and a target aware traffic conditioner in accordance with an embodiment of the present invention.

The graph 600 in FIG. 6 shows the results of the first simulation for both a standard traffic conditioner and a target aware traffic conditioner. For comparison, the expected bandwidth is also plotted. Neither the standard traffic conditioner nor the target aware traffic conditioner achieve the expected bandwidth. However, it is observed that the gap between the expected and achieved bandwidth for the standard traffic conditioner is generally greater than the gap between the expected and achieved bandwidth for the target aware traffic conditioner. It is also observed that the standard traffic conditioner provides an almost even distribution of the excess bandwidth between the two traffic streams, while the target aware traffic conditioner provides a more proportional distribution of the excess bandwidth between the two traffic streams.

A second simulation utilizes an extended network topology (not shown) having six edge nodes and six traffic sources. Experiments are run using bottleneck links of 45 Mbps and 22 Mbps. Six different traffic streams (aggregates) having different target rates are supported over 20 Mbps access links. The total allocated target rate (i.e., the sum of all six target rates) constitutes roughly 40% of the 45 Mbps link and roughly 80% of the 22 Mbps link.

Figure 7:
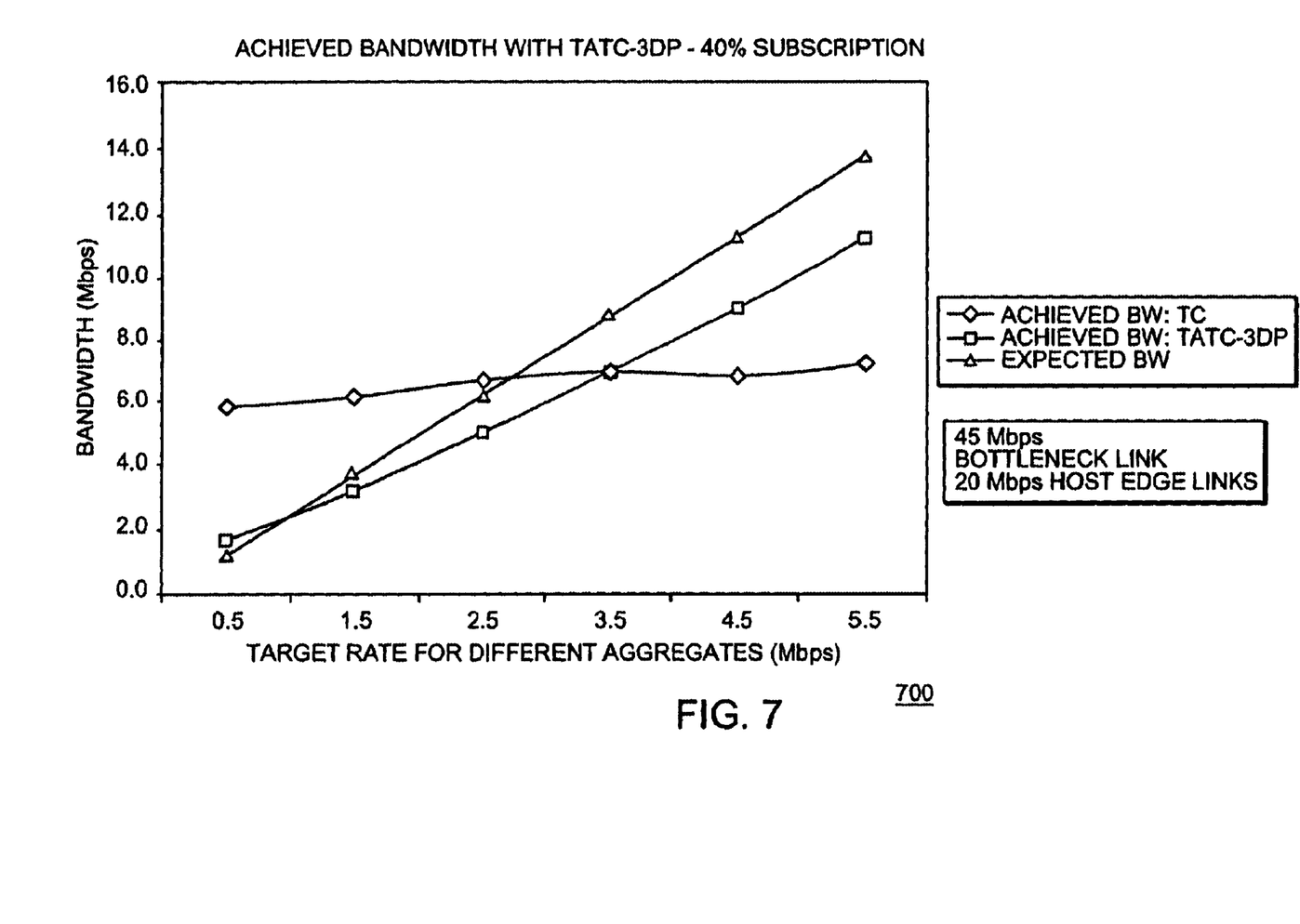
FIG. 7 is a graph showing results of a second simulation for both a standard traffic conditioner and a target aware traffic conditioner when the bottleneck link is at 40% of capacity in accordance with an embodiment of the present invention.

The graph 700 in FIG. 7 shows the results of the second simulation for both a standard traffic conditioner and a target aware traffic conditioner for the 40% capacity allocation case. For comparison, the expected bandwidth is also plotted. Neither the standard traffic conditioner nor the target aware traffic conditioner achieve the expected bandwidth. However, it is observed that the gap between the expected and achieved bandwidth for the standard traffic conditioner is generally greater than the gap between the expected and achieved bandwidth for the target aware traffic conditioner. It is also observed that the standard traffic conditioner provides an almost even distribution of the excess bandwidth between the two traffic streams, while the target aware traffic conditioner provides a more proportional distribution of the excess bandwidth between the two traffic streams.

Figure 8:
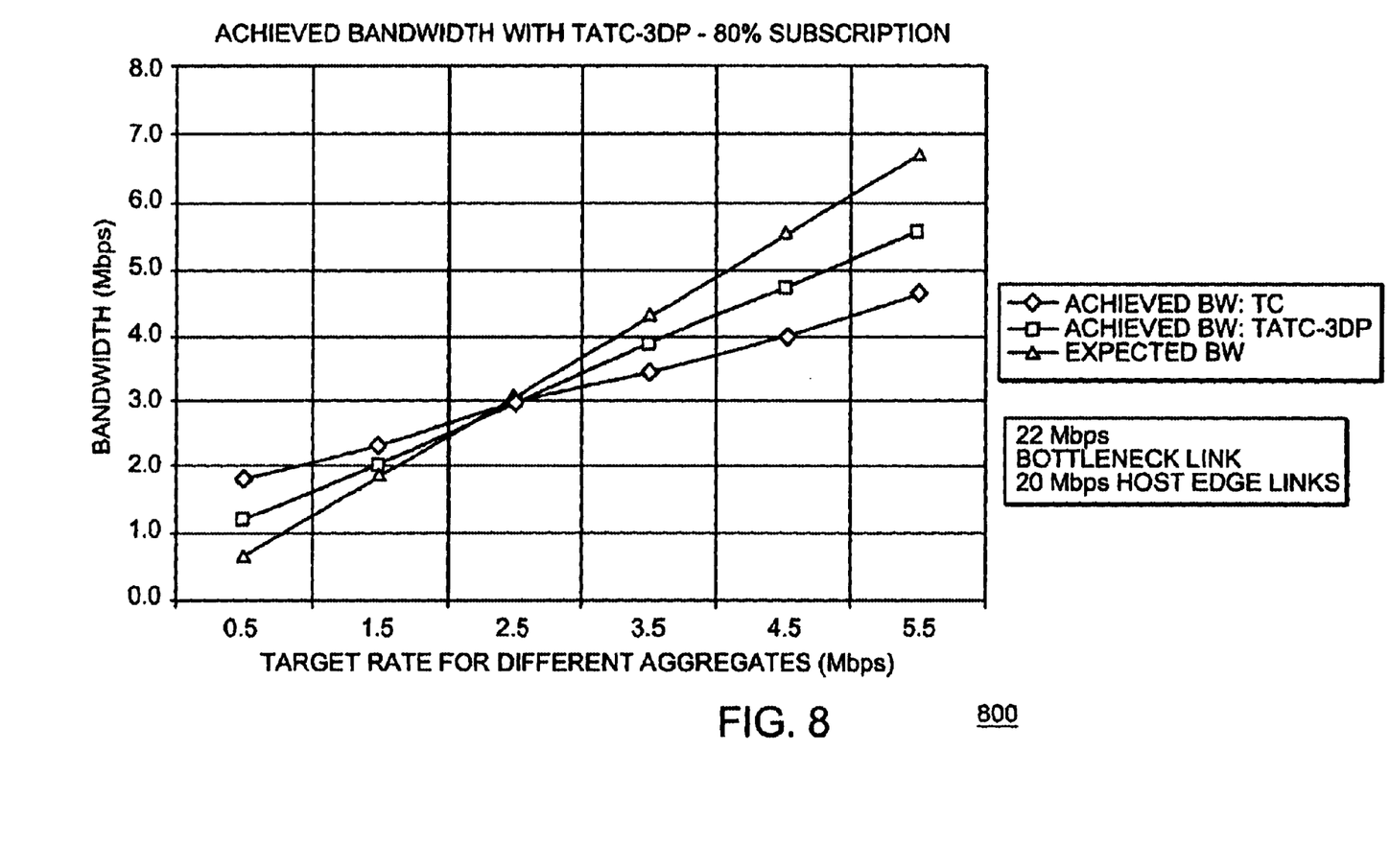
FIG. 8 is a graph showing results of a second simulation for both a standard traffic conditioner and a target aware traffic conditioner when the bottleneck link is at 80% of capacity in accordance with an embodiment of the present invention.

The graph 800 in FIG. 8 shows the results of the second simulation for both a standard traffic conditioner and a target aware traffic conditioner for the 80% capacity allocation case. For comparison, the expected bandwidth is also plotted. Neither the standard traffic conditioner nor the target aware traffic conditioner achieve the expected bandwidth. However, it is observed that the gap between the expected and achieved bandwidth for the standard traffic conditioner is generally greater than the gap between the expected and achieved bandwidth for the target aware traffic conditioner. It is also observed that the standard traffic conditioner provides an almost even distribution of the excess bandwidth between the two traffic streams, while the target aware traffic conditioner provides a more proportional distribution of the excess bandwidth between the two traffic streams.

Figure 9:
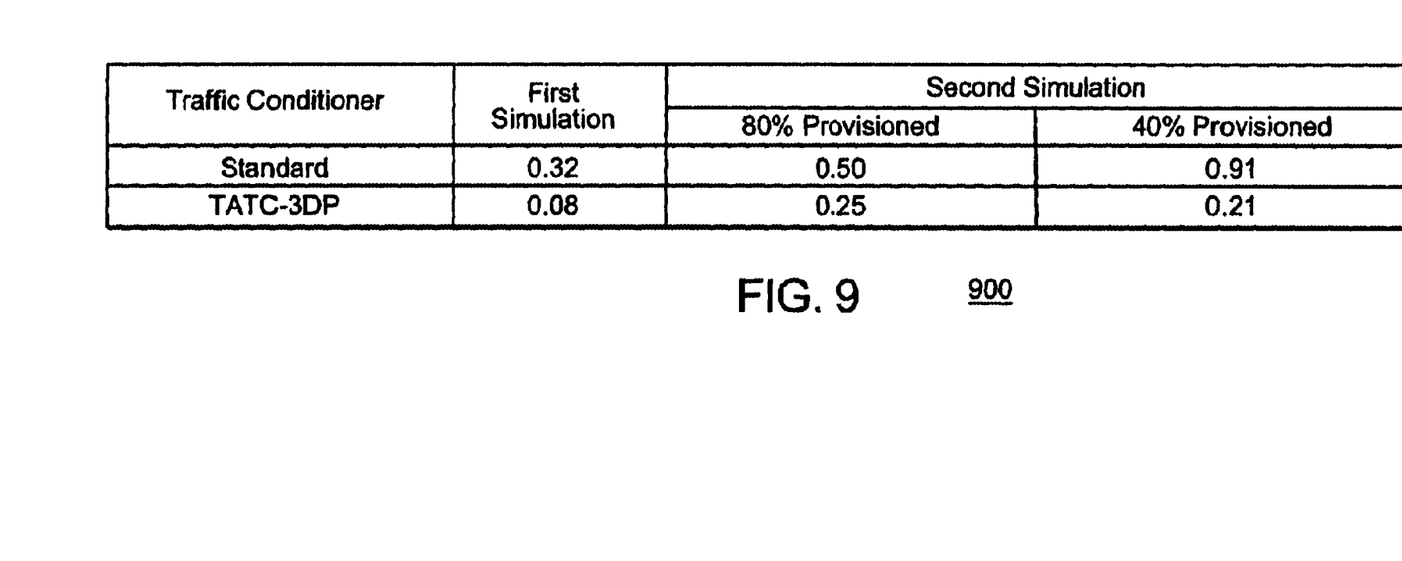
FIG. 9 is a table showing the average deviation from the expected value for both a standard traffic conditioner and a target aware traffic conditioner under various simulations of an embodiment of the present invention.

The table 900 in FIG. 9 shows the average deviation from the expected value for both a standard traffic conditioner and a target aware traffic conditioner under the various simulations. It is observed that the target aware traffic conditioner has substantially and consistently lower percentage deviation from the expected results than the standard traffic conditioner.

In order for the TATC 204 to mark out-of-profile packets, the TATC 204 makes various probability-based determinations. In an exemplary embodiment of the invention, a pseudo-random number generator is used to generate pseudo-random numbers from which the probability-based determinations are made. However, it should be noted that the present invention is in no way limited to the use of a pseudo-random number generator or to any particular mechanism for determining probabilities for such probability-based determinations.

While various embodiments of the invention are described with reference to a differentiated services communication system using three drop precedence levels per assured forwarding class, the present invention is in no way limited to a communication system using three drop precedence levels. It will be apparent to the skilled artisan that the target aware traffic conditioning techniques described herein can be extended to communication systems using any number of drop precedence levels. For one example, a target aware traffic conditioner may be applied to a communication system using two drop precedence levels (DP0 and DP1), in which case the target aware traffic conditioner may assign DP0 when the traffic stream is in-profile and assign DP0 with probability (1−q) and DP1 with probability (q) when the traffic stream is out-of-profile. For another example, a target aware traffic conditioner may be applied to a communication system using four drop precedence levels (DP0, DP1, DP2, and DP3), in which case the target aware traffic conditioner may assign DP0 when the traffic stream is in-profile, and, when the traffic stream is out-of-profile, assign DP1 with probability (1−p) and assign the remaining packets DP2 with probability (1−q) and DP3 with probability (q).

In a preferred embodiment of the present invention, predominantly all of the TATC logic is implemented as a set of computer program instructions that are stored in a computer readable medium and executed by a microprocessor within an edge device. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

It should be noted that the term "packet" is used generically to describe various protocol messages that are processed by a communication device, and should not be construed to limit application of the present invention to a specific protocol message format or communication protocol. Thus, a packet may be any protocol message including, but not limited to, a frame, a packet, a datagram, a user datagram, or a cell.

We claim:

1. In a communication system having a plurality of traffic streams, each traffic stream having a target rate and a measured rate, a traffic conditioning method for assigning a drop precedence value to each of a plurality of packets associated with a traffic stream, the drop precedence value equal to one of a first drop precedence value and a second drop precedence value higher than the first drop precedence value, the traffic conditioning method comprising:

determining that the measured rate is greater than the target rate; and assigning to each of the plurality of packets a drop precedence value such that, of all packets assigned either the first drop precedence value or the second drop precedence value, substantially (1−q) of the packets are assigned the first drop precedence value and substantially (q) of the packets are assigned the second drop precedence value, wherein q is equal to the ratio of a minimum target rate from among a plurality of traffic streams to the target rate of the traffic stream.

2. The traffic conditioning method of claim 1, wherein assigning to each of the plurality of packets a drop precedence value such that substantially (1−q) of the packets are assigned the first drop precedence value and substantially (q) of the packets are assigned the second drop precedence value comprises:

assigning the first drop precedence value to a packet with probability (1−q); and assigning the second drop precedence value to the packet with probability (q).

3. The traffic conditioning method of claim 2, wherein assigning the first drop precedence value to a packet with probability (1−q) and assigning the second drop precedence value to the packet with probability (q) comprises:

selecting a random number from zero to one;

assigning the first drop precedence to the packet, if the random number selected is less than (1−q); and assigning the second drop precedence value to the packet, if the random number selected is greater than or equal to (1−q).

4. The traffic conditioning method of claim 1, wherein the communication system is a differentiated services communication system supporting three drop precedence values per assured forwarding class for indicating a lowest drop precedence level (DP0), an intermediate drop precedence level (DP1), and a highest drop precedence level (DP2), and wherein the first drop precedence value corresponds to the intermediate drop precedence level (DP1) and the second drop precedence value corresponds to the highest drop precedence level (DP2).

5. In a communication system having a plurality of traffic streams, each traffic stream having a target rate and a measured rate, a method of assigning a drop precedence value to a packet that is associated with a traffic stream, the drop precedence value equal to one of a first drop precedence value and a second drop precedence value higher than the first drop precedence value, the method comprising:

determining that the measured rate is greater than the target rate;

assigning the first drop precedence value to the packet with a probability (1−q); and assigning the second drop precedence value to the packet with a probability (q), where q is equal to the ratio of a minimum target rate from among a plurality of traffic streams to the target rate of the traffic stream.

6. The method of claim 5, wherein assigning the first drop precedence value with the probability (1−q) and assigning the second drop precedence value with the probability (q) comprises:

selecting a random number from zero to one;

assigning the first drop precedence to the packet, if the random number selected is less than the value (1−q); and assigning the second drop precedence value to the packet, if the random number selected is greater than or equal to the value (1−q).

7. The method of claim 5, wherein the communication system is a differentiated services communication system supporting three drop precedence values per assured forwarding class for indicating a lowest drop precedence level (DP0), an intermediate drop precedence level (DP1), and a highest drop precedence level (DP2), and wherein the first drop precedence value corresponds to the intermediate drop precedence level (DP1) and the second drop precedence value corresponds to the highest drop precedence level (DP2).

8. In a communication system having a plurality of traffic streams, each traffic stream having a target rate and a measured rate, a method of assigning a drop precedence value to a packet that is associated with a traffic stream, the drop precedence value equal to one of a first drop precedence value, a second drop precedence value higher than the first drop precedence value, and a third drop precedence value higher than the second drop precedence value, the method comprising:

assigning the first drop precedence value to the packet with a probability (1−p), if the measured rate is greater than the target rate;

assigning the second drop precedence value to the packet with a probability (1−q), if the measured rate is greater than the target rate and the packet is not assigned the first drop precedence value with the probability (1−p); and assigning the third drop precedence value to the packet, if the measured rate is greater than the target rate and the packet is assigned neither the first drop precedence value with the probability (1−p) nor the second drop precedence value with the probability (1−q), wherein p is equal to the ratio of the measured rate minus the target rate to the measured rate, and wherein q is equal to the ratio of a minimum target rate from among a plurality of traffic streams to the target rate of the traffic stream.

9. The method of claim 8, further comprising:

assigning the first drop precedence value to the packet, if the measured rate is less than or equal to the target rate.

10. The method of claim 8, wherein the communication system is a differentiated services communication system supporting three drop precedence values per assured forwarding class for indicating a lowest drop precedence level (DP0), an intermediate drop precedence level (DP1), and a highest drop precedence level (DP2), and wherein the first drop precedence value corresponds to the lowest drop precedence level (DP0), the second drop precedence value corresponds to the intermediate drop precedence level (DP1), and the third drop precedence value corresponds to the highest drop precedence level (DP2).

11. A device comprising a target aware traffic conditioner for assigning a drop precedence value to a packet that is associated with a traffic stream having a target rate and a measured rate, wherein the target aware traffic conditioner comprises a packet marker operably coupled to assign a first drop precedence value to the packet with a probability (1−p), if the measured rate is greater than the target rate; assign a second drop precedence value higher than the first drop precedence value to the packet with probability a (1−q), if the measured rate is greater than the target rate and the packet is not assigned the first drop precedence value with the probability (1−p); and assign a third drop precedence value higher than the second drop precedence value to the packet, if the measured rate is greater than the target rate and the packet is assigned neither the first drop precedence value with probability the (1−p) nor the second drop precedence value with the probability (1−q), wherein p is equal to the ratio of the measured rate minus the target rate to the measured rate, and wherein q is equal to the ratio of a minimum target rate from among a plurality of traffic streams to the target rate of the traffic stream.

12. The device of claim 11, wherein the packet marker is operably coupled to assign the first drop precedence value to the packet, if the measured rate is less than or equal to the target rate.

13. The device of claim 11, wherein the target aware traffic conditioner further comprises rate measurement logic operably coupled to determine the measured rate for the traffic stream based upon packets received for the traffic stream and to provide the measured rate to the packet marker.

14. The device of claim 11, wherein the target aware traffic conditioner further comprises a target rate storage for storing at least a minimum target rate for a plurality of traffic streams and the target rate for the traffic stream.

15. The device of claim 14, wherein the target aware traffic conditioner further comprises means for determining the minimum target rate for the plurality of traffic streams.

16. The device of claim 15, wherein the means for determining the minimum target rate for the plurality of traffic streams comprises means for receiving target rate information for the plurality of traffic streams.

17. The device of claim 11, wherein the target aware traffic conditioner further comprises a pseudo-random number generator operably coupled to provide random values to the packet marker.

18. The device of claim 17, wherein the packet marker is operably coupled to assign the first drop precedence value to the packet with the probability (1−p) by selecting a first random number from zero to one using the pseudo-random number generator and assigning the first drop precedence value to the packet if the first random number is less than the value (1−p).

19. The device of claim 18, wherein the packet marker is operably coupled to assign the second drop precedence value to the packet with probability a (1−q) by selecting a second random number from zero to one using the pseudo-random number generator and assigning the second drop precedence value to the packet if the second random number is less than the value (1−q).

20. The device of claim 19, wherein the packet marker is operably coupled to assign the third drop precedence value to the packet if the second random number is greater than or equal to the value (1−q).

21. The device of claim 18, wherein the target aware traffic conditioner is a traffic conditioner for a differentiated services application supporting three drop precedence values per assured forwarding class for indicating a lowest drop precedence level (DP0), an intermediate drop precedence level (DP1), and a highest drop precedence level (DP2), and wherein the first drop precedence value corresponds to the lowest drop precedence level (DP0), the second drop precedence value corresponds to the intermediate drop precedence level (DP1), and the third drop precedence value corresponds to the highest drop precedence level (DP2).

22. A program product comprising a target aware traffic conditioner for assigning a drop precedence value to a packet that is associated with a traffic stream having a target rate and a measured rate, wherein the target aware traffic conditioner comprises a packet marker programmed to assign a first drop precedence value to the packet with a probability (1−p), if the measured rate is greater than the target rate; assign a second drop precedence value higher than the first drop precedence value to the packet with probability a (1−q), if the measured rate is greater than the target rate and the packet is not assigned the first drop precedence value with the probability (1−p); and assign a third drop precedence value higher than the second drop precedence value to the packet, if the measured rate is greater than the target rate and the packet is assigned neither the first drop precedence value with probability the (1−p) nor the second drop precedence value with the probability (1−q), wherein p is equal to the ratio of the measured rate minus the target rate to the measured rate, and wherein q is equal to the ratio of a minimum target rate from among a plurality of traffic streams to the target rate of the traffic stream.

23. The program product of claim 22, wherein the packet marker is programmed to assign the first drop precedence value to the packet, if the measured rate is less than or equal to the target rate.

24. The program product of claim 22, wherein the target aware traffic conditioner further comprises rate measurement logic programmed to determine the measured rate for the traffic stream based upon packets received for the traffic stream and to provide the measured rate to the packet marker.

25. The program product of claim 22, wherein the packet marker is programmed to obtain the minimum target rate for a plurality of traffic streams and the target rate for the traffic stream from a target rate storage.

26. The program product of claim 22, wherein the packet marker is programmed to assign the first drop precedence value to the packet with the probability (1−p) by selecting a first random number from zero to one and assigning the first drop precedence value to the packet if the first random number is less than the value (1−p).

27. The program product of claim 26, wherein the packet marker is programmed to assign the second drop precedence value to the packet with probability a (1−q) by selecting a second random number from zero to one and assigning the second drop precedence value to the packet if the second random number is less than the value (1−q).

28. The program product of claim 27, wherein the packet marker is programmed to assign the third drop precedence value to the packet if the second random number is greater than or equal to the value (1−q).

29. The program product of claim 22, wherein the target aware traffic conditioner is a traffic conditioner for a differentiated services application supporting three drop precedence values per assured forwarding class for indicating a lowest drop precedence level (DP0), an intermediate drop precedence level (DP1), and a highest drop precedence level (DP2), and wherein the first drop precedence value corresponds to the lowest drop precedence level (DP0), the second drop precedence value corresponds to the intermediate drop precedence level (DP1), and the third drop precedence value corresponds to the highest drop precedence level (DP2).

30. A communication system comprising a plurality of traffic streams supported by at least one edge node and a core node, wherein:

a traffic conditioning edge node supporting a traffic stream having a target rate and a measured rate greater than the target rate assigns a drop precedence value to each of a plurality of packets associated with the traffic stream such that, of all packets assigned either the first drop precedence value or the second drop precedence value, substantially (1−q) of the packets are assigned the first drop precedence value and substantially (q) of the packets are assigned the second drop precedence value, wherein q is equal to the ratio of a minimum target rate from among a plurality of traffic streams to the target rate of the traffic stream; and the core node selectively drops packets based upon at least the drop precedence value assigned to each of the plurality of packets.

31. The communication system of claim 30, wherein the traffic conditioning edge node and the core node provide differentiated services using three drop precedence values per assured forwarding class for indicating a lowest drop precedence level (DP0), an intermediate drop precedence level (DP1), and a highest drop precedence level (DP2), and wherein the first drop precedence value corresponds to the intermediate drop precedence level (DP1) and the second drop precedence value corresponds to the highest drop precedence level (DP2).

* * * * *

UNITED STATES PATENT AND TRADEMARK OFFICE
CERTIFICATE OF CORRECTION

PATENT NO. : 6,646,988 B1
DATED : November 11, 2003
INVENTOR(S) : Nandy et al.

It is certified that error appears in the above-identified patent and that said Letters Patent is hereby corrected as shown below:

Column 15,
Line 58, insert -- the -- after the word "with" and delete "a" after the word "probability."
Line 65, insert -- the -- after the word "with" and delete "the" after the word "probability."

Column 16,
Line 38, insert -- the -- after the word "with" and delete "a" after the word "probability."
Line 47, delete "18" and insert therefore -- 11 --.
Line 67, insert -- the -- before the word "probability" and delete "a" after the word "probability."

Column 17,
Line 6, insert -- the -- after the word "with" and delete "the" after the word "probability."
Line 34, insert -- the -- after the word "with" and delete "a" after the word "probability."

Signed and Sealed this

Fifth Day of July, 2005

JON W. DUDAS
*Director of the United States Patent and Trademark Office*